(12) United States Patent
Nowak

(10) Patent No.: US 6,393,813 B1
(45) Date of Patent: May 28, 2002

(54) FEED CONVEYOR AND CROP RECEIVING ASSEMBLY BRAKING SYSTEM

(75) Inventor: Martin Nowak, Warendorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 2 days.

(21) Appl. No.: 09/605,106

(22) Filed: Jun. 28, 2000

(30) Foreign Application Priority Data

Jun. 30, 1999 (DE) .......................... 199 29 987

(51) Int. Cl.$^7$ .............................. A01D 61/00
(52) U.S. Cl. .................. 56/10.2 J; 56/10.3; 56/11.3
(58) Field of Search .................. 56/10.2 R, 10.2 J, 56/10.3, 10.8, 11.3, 11.6, 11.4, 11.5, DIG. 6, DIG. 15

(56) References Cited

U.S. PATENT DOCUMENTS

| | | | |
|---|---|---|---|
| 4,253,556 A | | 3/1981 | Zindler |
| 4,324,324 A | * | 4/1982 | Priepke et al. ................. 56/10.2 |
| 4,332,127 A | * | 6/1982 | Staiert et al. ................. 56/10.2 |
| 5,033,595 A | * | 7/1991 | Pardee ........................ 56/11.3 |
| 5,529,157 A | * | 6/1996 | Desrochers .................... 192/16 |
| 6,073,428 A | * | 6/2000 | Diekhans ................... 56/10.2 R |
| 6,141,947 A | * | 11/2000 | Borling ....................... 56/10.8 |
| 6,247,296 B1 | * | 6/2001 | Becker et al. ................. 460/20 |
| 6,318,056 B1 | * | 11/2001 | Rauch et al. .............. 56/10.2 J |

FOREIGN PATENT DOCUMENTS

| | | |
|---|---|---|
| DE | 22 45 602 C2 | 4/1973 |
| DE | 30 43 395 A1 | 11/1980 |
| DE | 30 14 914 C2 | 10/1981 |
| DE | 31 11 906 C2 | 3/1982 |
| DE | 41 29 113 A1 | 3/1993 |
| DE | 43 26 305 C2 | 2/1997 |
| DE | 198 12 500 A1 | 9/1999 |
| GB | 2169366 A * | 7/1986 |

* cited by examiner

Primary Examiner—Robert E. Pezzuto
Assistant Examiner—Nathan Mammen
(74) Attorney, Agent, or Firm—Husch & Eppenberger, LLC; Robert E. Muir; H. Frederick Rusche

(57) ABSTRACT

An agricultural harvesting machine has a feed conveyor assembly arranged in the front region and a crop receiving assembly attached thereto. The two drive shafts of these assemblies are fitted with drive pulleys over which a common belt is entrained to drive the assemblies. A slip clutch is located between the pulley and the drive shaft for the feed conveyor. A brake is associated with the drive shaft for the feed conveyor by which the drive shaft can be braked suddenly when foreign objects appear in the feed region. The crop receiving assembly is braked by at least one slip clutch which is activated by the brake.

15 Claims, 3 Drawing Sheets

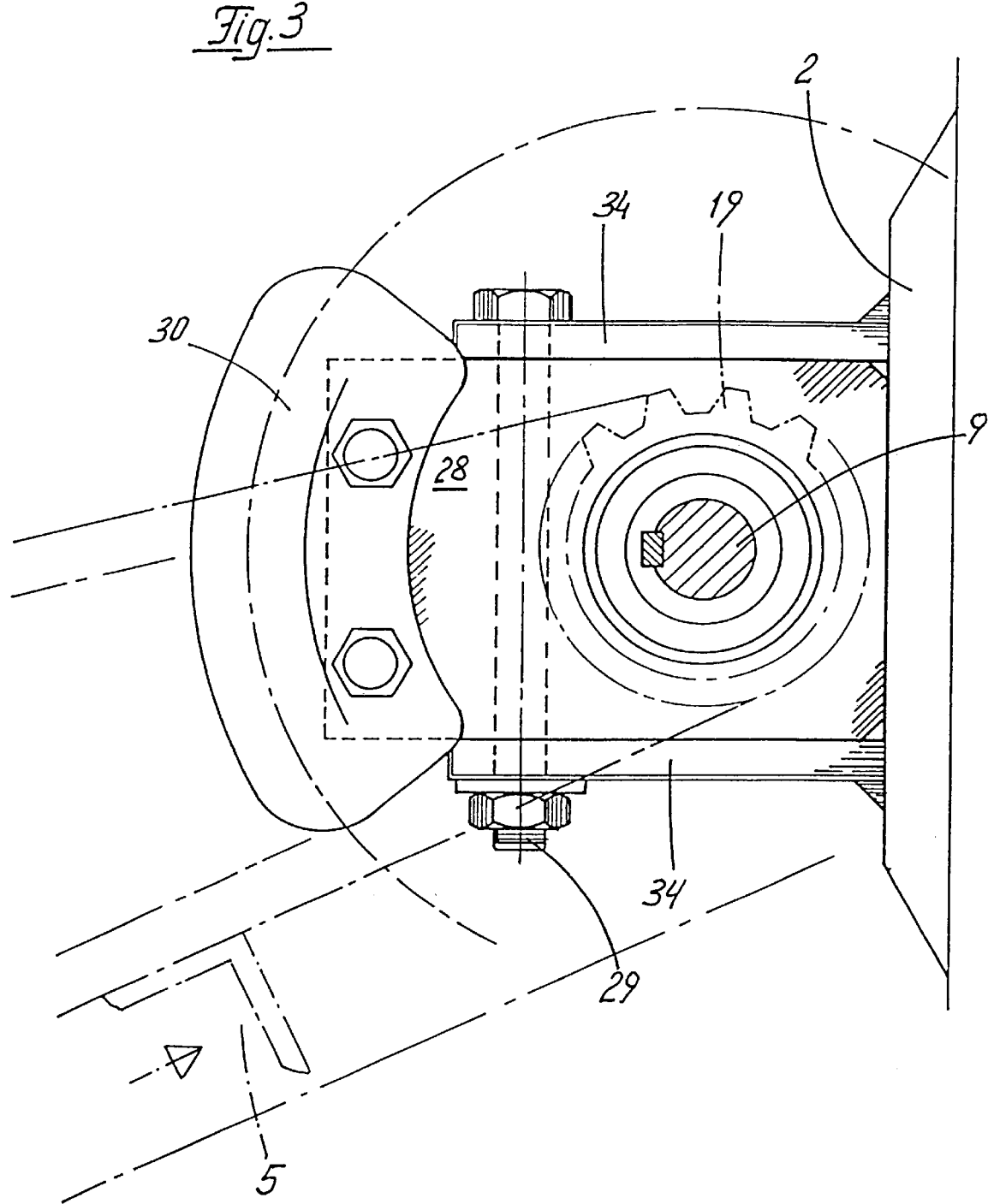

FEED CONVEYOR AND CROP RECEIVING ASSEMBLY BRAKING SYSTEM

FIELD OF THE INVENTION

The present invention relates generally to agricultural machinery and, more particularly, to a braking system for both the feed conveyor and crop receiving assembly in an agricultural harvesting machine.

BACKGROUND OF THE INVENTION

Agricultural harvesting machines are commonly equipped with a feed conveyor and crop receiving assembly attached to a front region of the machine. The feed conveyor is normally provided with a drive shaft. The drives of both the feed conveyor and the crop receiving assembly may be derived from a pulley releasably connected with the engine of the harvesting machine by a clutch.

During operation of such a harvesting machine, the driver must keep a constant vigil for foreign objects that appear in the path of the machine and could enter the feed mechanism of the harvester. As soon as a foreign object appears, the driver releases the clutch for the drive of the whole combine harvester front attachment by means of a manually operated lever. This procedure is intended to prevent any foreign objects from being drawn into the machine and causing damage. However, this measure has proven extremely unsatisfactory because the feed conveyor and crop receiving assembly are braked only by the inherent friction of the system after disconnection of the drive train for the whole combine harvester front attachment. Foreign objects are often conveyed into the machine due to the continued running of the feed components.

SUMMARY OF THE INVENTION

The feed conveyor drive shaft is fitted with a pulley which also drives the crop receiving assembly. The pulley is connected by a slip clutch with the feed conveyor drive shaft. One end of the drive shaft for the feed conveyor is mounted rotatably in a bushing rigidly connected with the housing of the feed conveyor. The bushing carries a brake caliper. A brake disk that cooperates with the brake caliper is rigidly connected with the feed conveyor drive shaft. The brake itself may be a disk brake or other commercially available brake.

The use of a slip clutch to connect the drive of the crop receiving means with the feed conveyor drive shaft precludes both the feed conveyor and the crop receiving assembly from being braked suddenly by operation of the brake. In this way, on operation of the brake the relatively low mass of the feed conveyor is then braked suddenly and the crop receiving assembly is gradually stopped by the slip clutch. The slip clutch may be adjusted to increase or decrease the time required to stop the crop receiving assembly.

It is an object of the present invention to a provide a braking system for the feed components of a harvesting machine that minimizes further intake of crops after disconnection of the drive train for the feed components.

Another object of the present invention is to provide a braking system which is triggered at roughly the same time as the pulley clutch for the drive train is operated.

These and other objects, aspects, features and advantages of the present invention will become apparent from the following detailed description when taken in conjunction with the referenced drawings.

BRIEF DESCRIPTION OF THE DRAWINGS

Reference is now made more particularly to the drawings which illustrate the best presently known mode of carrying out the invention and wherein similar reference characters indicate the same parts throughout the views.

FIG. 3 is a sectional view taken generally along the line III—III in FIG. 2.

DETAILED DESCRIPTION

Figure 1:
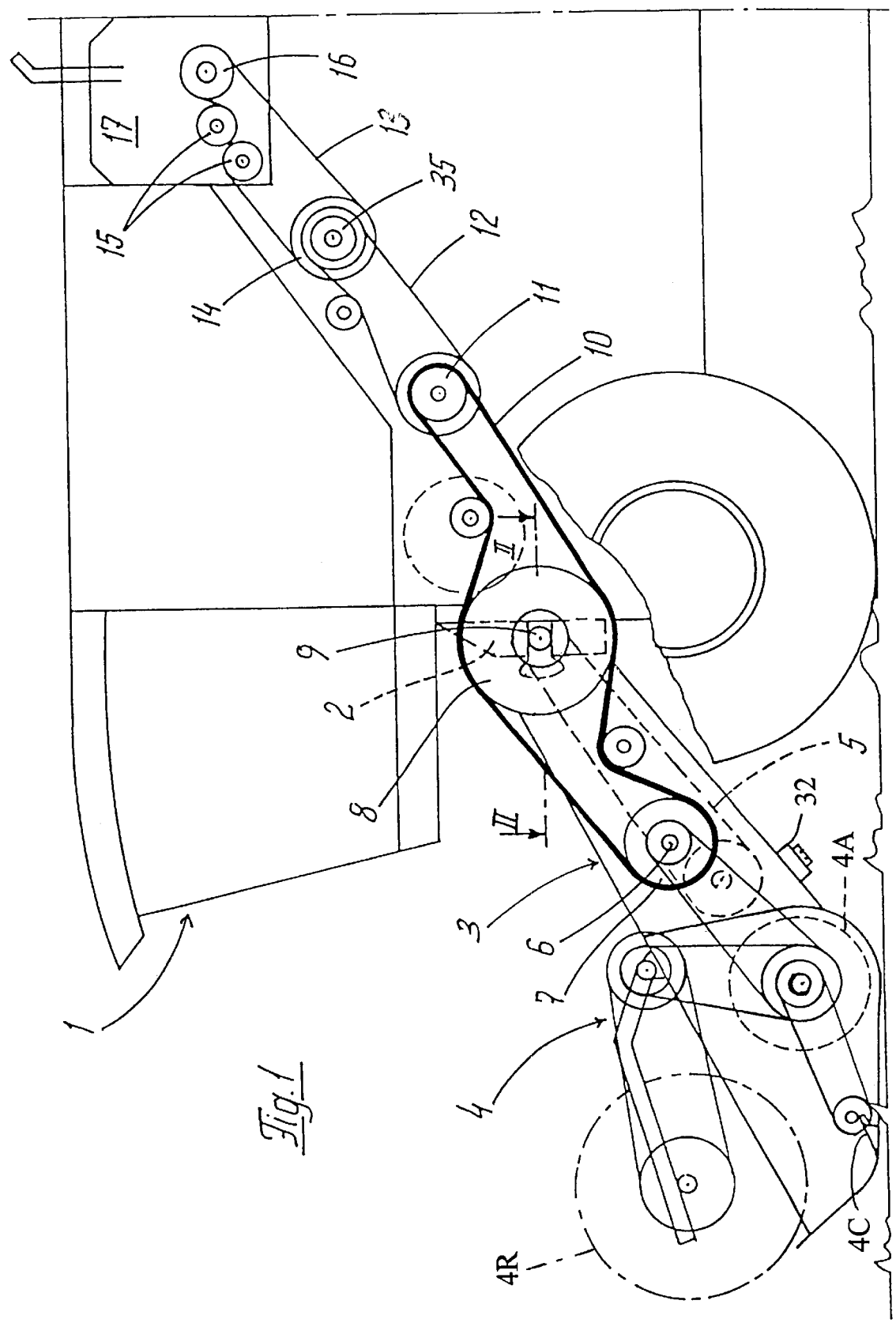
FIG. 1 is a schematic view of a front part of a self-propelled combine harvester.

FIG. 1 shows a front part 1 of an agricultural harvesting machine with a front frame 2 carrying a combine harvester front attachment 3. The combine harvester front attachment 3 includes a receiving assembly 4 and a feed conveyor 5. The receiving assembly typically includes a reel 4R located above a cutter bar 4C and an auger 4A located behind and somewhat above the cutter bar. The feed conveyor 5 is sometimes called a front elevator. A pulley 7 is fitted on a shaft 6 for the drive train of the receiving assembly 4. A second pulley 8 is fitted on a drive shaft 9 of the feed conveyor 5. Both pulleys 7, 8 are engaged by a common belt 10 which is driven by a third pulley 11. This pulley 11 is connected by further endless belts 12 and 13 and corresponding pulleys 14 and guide rollers 15 to a drive pulley 16 of an engine 17. The drive train extending between the engine 17 and the combine harvester front attachment 3 can be uncoupled from the engine 17 by means of a clutch 35. Since a drive model of this kind is known in practice, it will not be described in more detail. A similar drive system is disclosed in German patent 43 26 305 C2.

Figure 2:
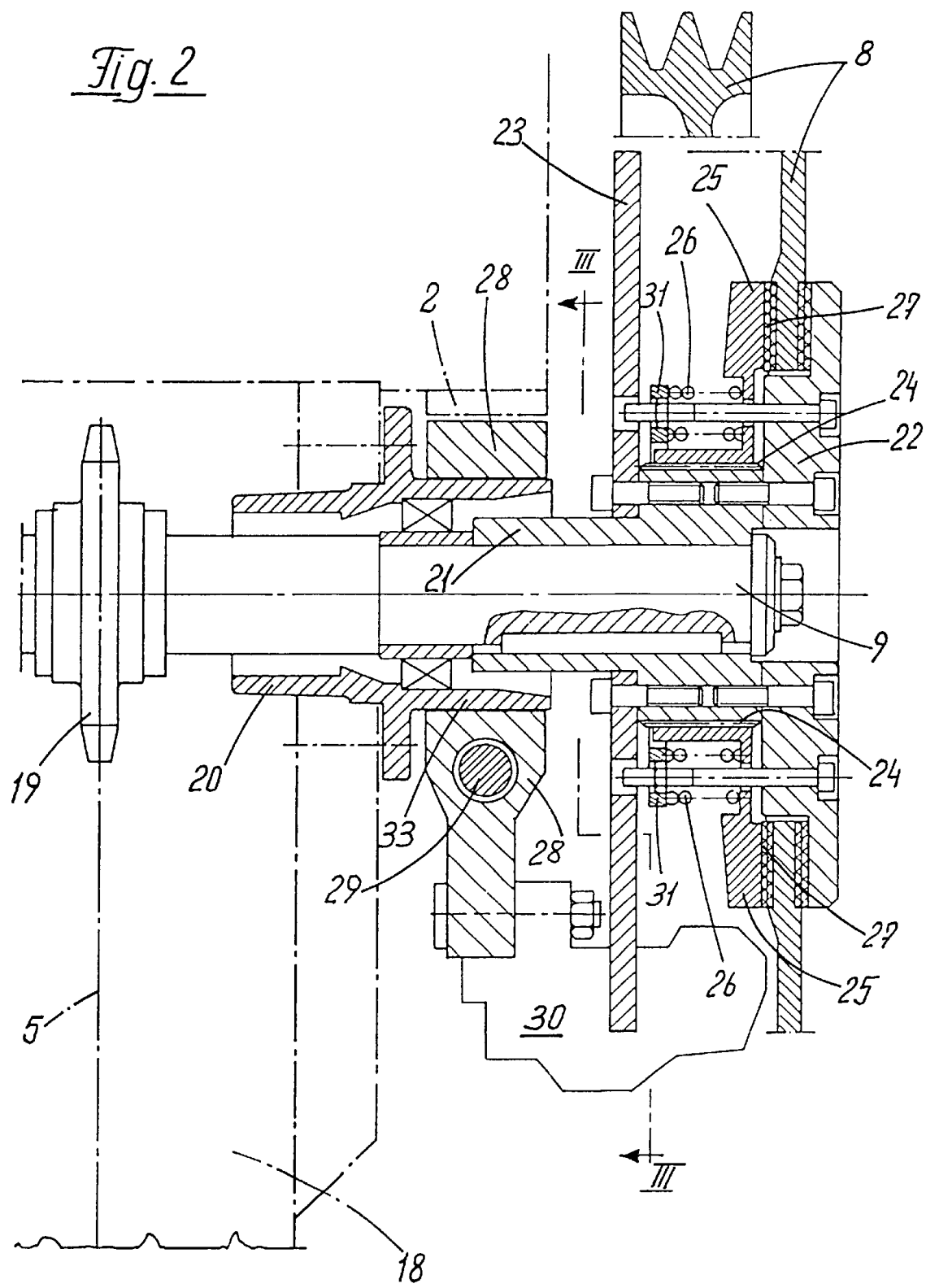
FIG. 2 is a sectional view taken generally along the line II—II in FIG. 1.

FIG. 2 shows the drive shaft 9 for the feed conveyor 5 which extends into the feed conveyor channel 18 and is fitted with several sprockets 19, only one of which is shown. On one side of the feed conveyor channel 18, the drive shaft 9 is mounted freely rotatably in a bushing 20 by a bearing. A hub 21, including an end cover 22, is splined on the outwardly projecting end of the drive shaft 9. Furthermore, a brake disk 23 is bolted to the hub 21 at an axial distance from the cover 22. In the region between the brake disk 23 and the cover 22, the hub 21 has an external tooth system 24. Corresponding to the tooth system 24 is an equally toothed cone pulley 25 which is pressed against the cover 22 by means of a compression spring 26 with the interposition of a brake lining 27 and the pulley 8, for driving the shaft 9 for the feed conveyor 5. As can be seen from FIG. 1, the pulley 8 for the drive of the feed conveyor and the pulley 7 for the drive of the crop receiving assembly 4 are engaged by a common belt 10.

It can further be seen from FIG. 2 that the feed conveyor channel 18 is pivotably coupled by its upper drive shaft 9 to the front frame 2 of the harvester 1. For this purpose the shaft 9 is mounted by means of bushings 20 with its ends in the side walls of the conveying channel 18.

On the outer rings 33 of the bushings 20 are fitted shaped pieces 28 with plain bearings. By means of these shaped pieces 28, the feed conveyor channel 18 is connected to the machine frame 2 in such a way that the shaped pieces 28 are set in forked brackets 34 welded to the frame 2 and fixed in position by screw bolts 29. Attached to the end of the shaped piece 18 facing away from the frame 2, on the drive side of the conveying channel 18, is the brake caliper 30 of a disk brake system 23, 30.

If the clutch 35 (see FIG. 1) is now released by the combine harvester driver when foreign objects appear, the brake caliper 30 is thus also operated roughly at the same time and then suddenly brakes the disk 23. As this disk 23 is rigidly connected by the hub 21 to the drive shaft 9 of the feed conveyor 5, the latter is immediately braked too. The crop receiving assembly 4 is braked with only a minor delay by means of the slip clutch 25, 26, 27, because the cone pulley 25 of the slip clutch presses the pulley 8 against the braked cover 22 with the interposition of brake linings. The run-on of the crop receiving assembly 4 can be varied by adjustment of the slip clutch 25, 26, 27. For this purpose the compression springs 26 can be biased to a greater or lesser degree by displacement of the plates 31.

In another embodiment, the disk brake 23, 30 can be engaged by a foreign object detector 32, shown schematically in FIG. 1, instead of being manually engaged by the operator.

Other objects, features and advantages of the present invention will be apparent to those skilled in the art. While a preferred embodiment of the present invention have been illustrated and described, this has been by way of illustration and the invention should not be limited except as required by the scope of the appended claims and their equivalents.

I claim:

1. An agricultural harvesting machine having a feed conveyor with a drive shaft, a crop receiving assembly with a drive connected with the feed conveyor drive shaft, a drive pulley releasably connected by a clutch with an engine and connected with the feed conveyor drive shaft and the crop receiving assembly, and a braking system for the feed conveyor and crop receiving assembly including a brake associated with the feed conveyor drive shaft, wherein one end of the feed conveyor drive shaft is rotatably mounted in a bushing which is connected with a housing of the conveyor and wherein the bushing carries a brake caliper.

2. An agricultural harvesting machine according to claim 1, wherein the brake associated with the feed conveyor drive shaft is operated at roughly the same time as the first clutch.

3. An agricultural harvesting machine according to claim 1, further including a foreign object detector that can trigger the brake for the feed conveyor drive shaft.

4. An agricultural harvesting machine according to claim 1, wherein the brake for the feed conveyor drive shaft is a disk brake.

5. An agricultural harvesting machine according to claim 1, wherein the drive of the crop receiving assembly is connected by a second clutch with the feed conveyor drive shaft, said second clutch being a slip clutch.

6. An agricultural harvesting machine according to claim 1, further including a pulley connected with the feed conveyor drive shaft which drives the crop receiving assembly wherein the pulley is connected with the feed conveyor drive shaft by a second clutch, said second clutch being a slip clutch.

7. An agricultural harvesting machine according to claim 1, wherein a brake disk, which cooperates with the caliper, is connected to the feed conveyor drive shaft.

8. An agricultural harvesting machine according to claim 1, wherein the brake caliper is connected to the bushing by a shaped piece.

9. An agricultural harvesting machine having a feed conveyor with a drive shaft, a crop receiving assembly with a drive connected with the feed conveyor drive shaft, a drive pulley releasably connected by a first clutch with an engine and connected with the feed conveyor drive shaft and the crop receiving assembly, and a braking system for the feed conveyor and crop receiving assembly including:
   a brake associated with the feed conveyor drive shaft which is operated at roughly the same time as the first clutch; and
   a second clutch which connects the drive of the crop receiving assembly with the feed conveyor drive shaft, operates as a brake on the crop receiving assembly, and is activated by operation of the brake, said second clutch being a slip clutch.

10. An agricultural harvesting machine according to claim 9, including a foreign object detector that triggers the brake for the feed conveyor drive shaft.

11. An agricultural harvesting machine according to claim 9, wherein the brake for the feed conveyor drive shaft is a disk brake.

12. An agricultural harvesting machine according to claim 9, including a pulley connected with the feed conveyor drive shaft which drives the crop receiving assembly wherein the pulley is connected with the feed conveyor drive shaft by the second clutch.

13. An agricultural harvesting machine according to claim 9, wherein one end of the feed conveyor drive shaft is rotatably mounted in a bushing which is connected with a housing of the feed conveyor and wherein the bushing carries a brake caliper.

14. An agricultural harvesting machine according to claim 13, wherein a brake disk, which cooperates with the brake caliper, is connected to the feed conveyor drive shaft.

15. An agricultural harvesting machine according to claim 13, wherein the brake caliper is connected to the bushing by a shaped piece.

* * * * *